United States Patent [19]

Chu

[11] Patent Number: 5,637,984

[45] Date of Patent: Jun. 10, 1997

[54] PSEUDO-MECHANICAL SYSTEM INCORPORATING OHMIC ELECTROMECHANICAL TRANSDUCER AND ELECTRICAL GENERATOR

[75] Inventor: John W.-S. Chu, Cupertino, Calif.

[73] Assignee: Nanotechnology, Inc., Cupertino, Calif.

[21] Appl. No.: 326,718

[22] Filed: Oct. 20, 1994

[51] Int. Cl.$^6$ .................. H02J 1/00; H02N 2/00
[52] U.S. Cl. .................. 322/8; 318/117; 70/91; 242/223; 604/181
[58] Field of Search .................. 322/8; 337/70, 337/140; 307/153

[56] References Cited

U.S. PATENT DOCUMENTS

| | | |
|---|---|---|
| 2,926,293 | 2/1960 | Camm et al. . |
| 4,002,954 | 1/1977 | Orlando . |
| 4,675,640 | 6/1987 | DiMarco et al. . |
| 4,700,541 | 10/1987 | Gabriel et al. . |
| 4,747,887 | 5/1988 | Honma .................. 148/131 |
| 4,812,749 | 3/1989 | Sato et al. .................. 324/106 |
| 4,820,910 | 4/1989 | Higo et al. .................. 235/439 |
| 4,864,824 | 9/1989 | Gabriel et al. . |
| 4,900,078 | 2/1990 | Bloch .................. 294/86.4 |
| 4,912,460 | 3/1990 | Chu . |
| 5,061,914 | 10/1991 | Busch et al. . |
| 5,085,136 | 2/1992 | Eisenberg .................. 99/391 |
| 5,103,807 | 4/1992 | Makaran .................. 128/26 |

*Primary Examiner*—Steven L. Stephan
*Assistant Examiner*—Nicholas Ponomarenko
*Attorney, Agent, or Firm*—Fliesler Dubb Meyer & Lovejoy

[57] ABSTRACT

A pseudo-mechanical system in accordance with the invention comprises an electrical generator which converts mechanical energy into electrical energy to power the resistive heating of an ohmic electromechanical component, whose consequent form change is exploited to perform mechanical work.

2 Claims, 3 Drawing Sheets

5,637,984

PSEUDO-MECHANICAL SYSTEM INCORPORATING OHMIC ELECTROMECHANICAL TRANSDUCER AND ELECTRICAL GENERATOR

TECHNICAL FIELD

This invention relates to utilization of an ohmic element which changes shape when a current is passed through it, an electrical generator and a decision making apparatus. Mechanical energy input, such as can be provided by pushing a key into a lock, pushing on push buttons, unreeling of a fishing line, etc. is converted by the electrical generator into electrical energy which provides a current through the ohmic element and which also may be used to power the decision making apparatus. The change in shape of the ohmic element serves as a gate via which, for example, the lock is unlocked, the tension in the fishing line is controlled, etc.

BACKGROUND OF THE INVENTION

Components made of Shape Memory Alloys (SMA), such as TiNi, return to a predetermined form when heated from a relatively limp Martensitic state to a relatively stiff Austenitic state. This process is reversible. Some SMA components can even be trained to take on two distinct forms depending on their body temperature.

Bimetallic components can also perform in a similar way.

Applications abound in which electrical current is passed through to heat up such components to bring about the desired form change, which is exploited to perform some mechanical work. Such heating is due to the power dissipation of the electrical resistance inherent to the components and is by definition a classical ohmic phenomenon.

Even the basic expansion and contraction of material caused by heat and cold are sometimes exploited in this manner.

For example, U.S. Pat. Nos. 4,002,954 and 4,700,541 employ SMA components to perform triggering and positioning functions; bimetallic contacts that heat up . . . open . . . cool down . . . close . . . heat up . . . are extensively used in automobile turning lights, and U.S. Pat. No. 4,675,640 employs a bimetallic strip as a circuit breaker; U.S. Pat. No. 2,926,293 employs a simple metal wire as an actuator.

In all cases, including the aforementioned, electrical power is supplied by power supplies or batteries. This means that when power or batteries fail, these systems are rendered unusable. In cases such as electronic door locks or medical equipment, such disability can lead to catastrophe.

The use of batteries not only is costly, it also imposes a waste-disposal problem.

In many applications, such as in electronic door locks, electronic fishing reels, derailleur gears for bicycles, and cameras, system operation is always accompanied by an ample supply of mechanical energy. In accordance with U.S. Pat. No. 4,912,460, which is incorporated herein by reference, part of the mechanical energy is channeled to run an electric generator to provide the necessary electrical power for operating a decision making apparatus and for electrostatically moving a mechanical gate. Such a pseudo-mechanical system operates without external electrical power or batteries, thereby providing solutions to the cost, disability and waste disposal problems mentioned above. A problem with electrostatically moving the gate is that the plates of the electrostatic activator must be very close together whereby the amount of movement which results is relatively small leading to difficulties in design and very close tolerance requirements. The preferred apparatus of the U.S. Pat. No. 4,912,460 patent utilizes a piezoelectric bimorph in the nature of a conductor-ceramic-conductor-ceramic-conductor sandwich. On application of electrical charge the bimorph flexes only a very small amount, generally less than about 0.001 inch.

As evidenced by U.S. Pat. Nos. 4,864,824 and 5,061,914, microelectronic semiconductor processing technology is used to fabricate all kinds of ohmic electromechanical actuators, and it is common knowledge in the field of nanotechnology that minuscule electric motors can be fabricated with integrated circuit process technology and can be part of a semiconductor chip. The operation of these microactuators and micro-engines, because of their minute physical size, needs only submillijoule levels of energy which can be produced unobtrusively by miniature generators contained in, for example, embedded inside, systems incorporating such actuators and engines.

Modern electrical generators that convert mechanical energy into electrical energy have been around for over a hundred years. Electromagnetism, piezoelectricity, magnetostrictivity and other phenomena can all be utilized in implementing such generators. The technologies are well known to those versed in the art and are beyond the scope of the present invention.

SUMMARY OF THE INVENTION

A pseudo-mechanical system in accordance with the invention comprises an electrical generator which converts mechanical energy into electrical energy to power the resistive heating of an ohmic electromechanical component, whose consequent form change is exploited to perform mechanical work.

A plurality of such systems can incorporate decision making apparatus, some of which are electronic and are powered by the same generators.

In fashions indistinguishable from purely mechanical systems, such systems operate in the absence of external power supplies and batteries, but contain the intelligence of the embedded decision making apparatus, such as microcomputers.

BRIEF DESCRIPTION OF THE DRAWINGS

The invention will be better understood by reference to the figures of the drawings wherein like parts denote like parts throughout and wherein.

BEST MODE FOR CARRYING OUT INVENTION

Figure 1:
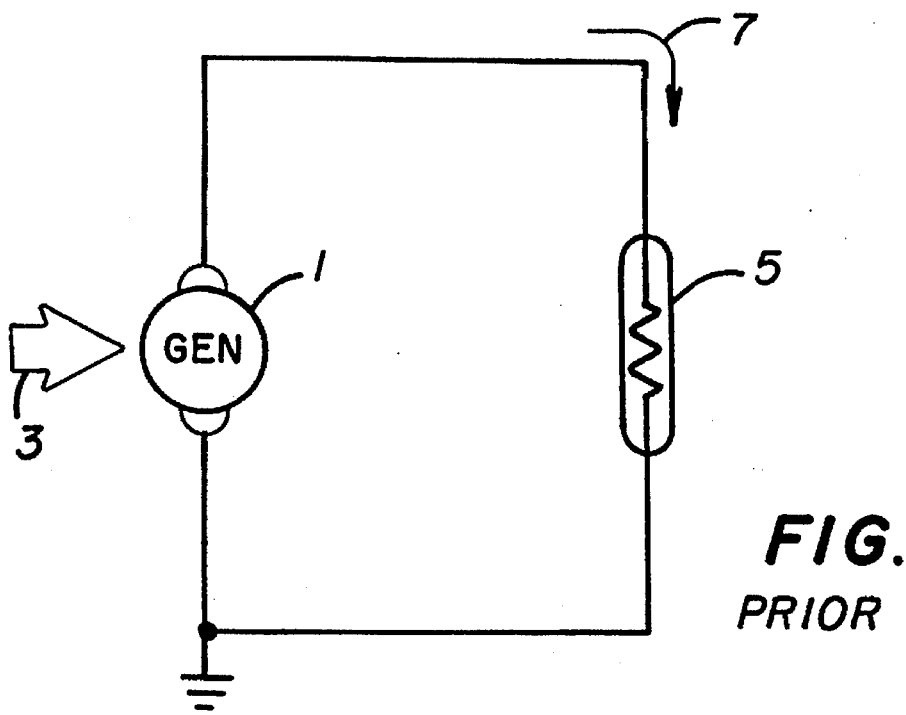
FIG. 1 shows the core of the invention, comprising a generator, its mechanical energy input, and an ohmic electromechanical transducer.

Referring to FIG. 1, generator 1 gets mechanical energy input 3 from the agent operating the system and generates the electrical current 7 needed for heating up an ohmic electromechanical transducer 5, causing it to change in shape, e.g., via a martensitic to austenitic crystal structure shift, via heating of a bimetallic element, etc., to a predetermined form so that mechanical work can be performed. For example, the mechanical energy input can be derived from mechanical movement of a member such as a lever, a key, a card, one or more push buttons, a spool, a wheel, etc. In this case, the ohmic electromechanical transducer may simply be the aforementioned open-close-open-close . . . contact used to cause flashing of automobile turning lights.

Figure 2:
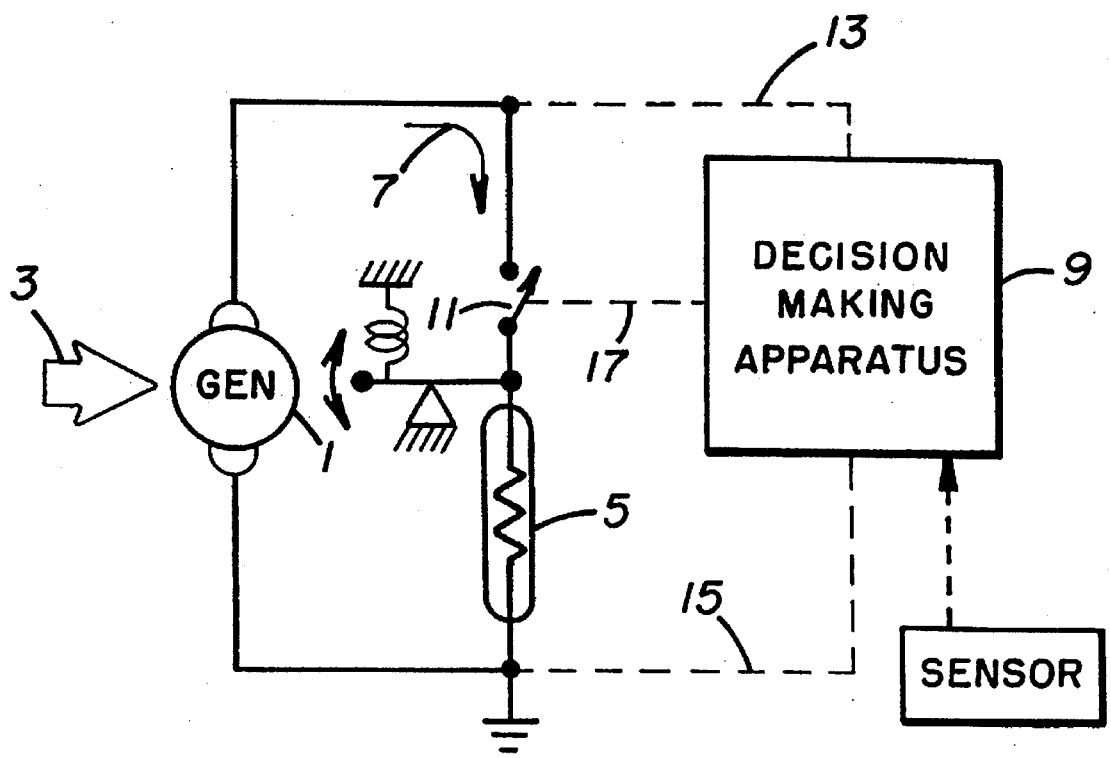
FIG. 2 shows a decision making apparatus and the switch it controls, in addition to those shown in FIG. 1.

In most applications, more sophisticated decision making is performed. Referring to FIG. 2, a decision making apparatus 9 controls a switch 11 which, when closed, allows electrical current 7 to pass through and heat up the ohmic electromechanical transducer 5. The decision making apparatus 9 can be electronic or otherwise, e.g., a mercury switch or other status (tension, slope, acceleration, temperature, pressure, etc.) sensor. If it is electronic, generator 1 can also provide the electrical energy needed by it via dotted lines 13 and 15. Dotted line 17, which can be an electrical connection, an optielectronic link or any of many different linkages, connects the output of the decision making apparatus 9 to switch 11, which can be a bipolar or MOSFET transistor, a relay or any of many different types of switches.

PREFERRED EMBODIMENTS

1. Electronic Door Lock

Figure 3A:
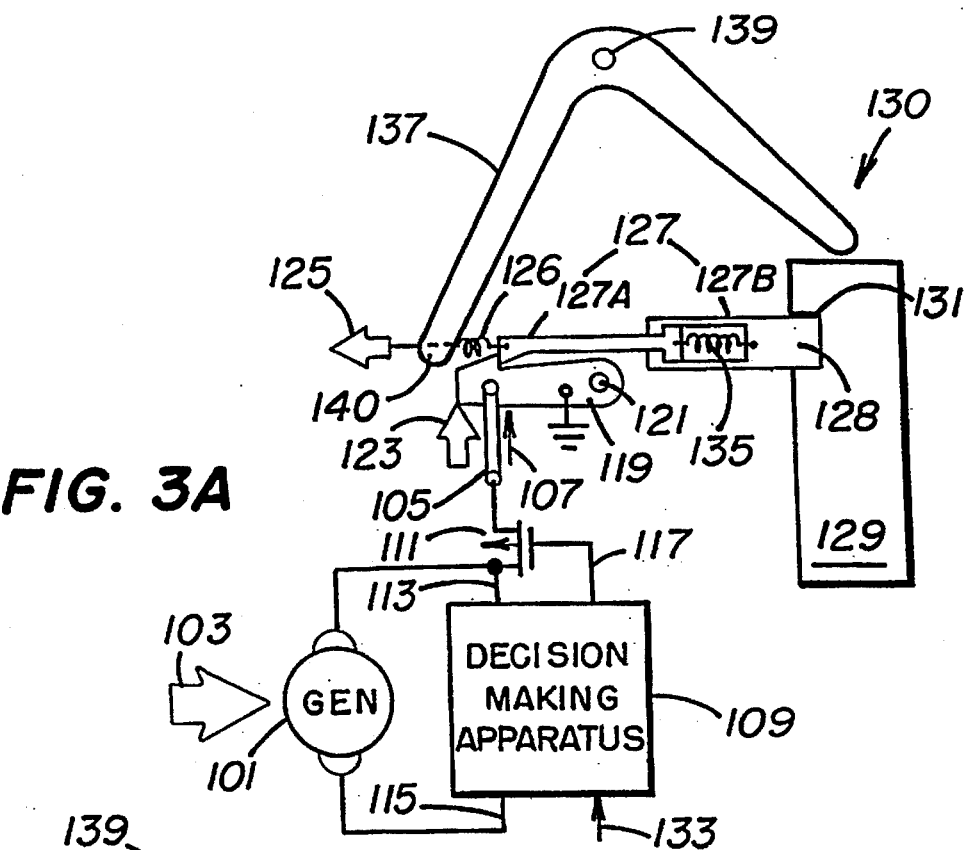
FIGS. 3A, 3B and 3C show how, with the addition of a ratchet, a mechanical gate and a bolt, an electronic door lock is implemented.

FIG. 3A shows the bolt 129 of a lockset 130 in the locked (down) position. A slot 131 in the bolt 129 dovetails with the end 128 of a mechanical gate 127, which prevents the lifting of bolt 129 to the unlocked (up) position. Mechanical gate 127 is spring-loaded by spring 126 with force as represented by 125, which if left alone would pull mechanical gate 127 to the left, disengaging the dovetailing and allows bolt 129 to be moved to the unlocked (up) position. For reasons to be made clear later, mechanical gate 127 comprises an inner mechanical gate 127A and an outer mechanical gate 127B in such a construction that the inner mechanical gate 127A can telescope into the outer mechanical gate 127B. A compression spring 135 is placed to act between the inner mechanical gate 127A and the outer mechanical gate 127B so that, in the absence of external forces, mechanical gate 127 as a whole assumes its longest length. Mechanical gate 127 is cocked by a ratchet 119, with pivot 121, which is kept in this cocked position by a clockwise spring force indicated at 123. An L-shaped cam 137 with pivot 139 serves to set the lockset up, during the unlocking process, and to relock the lockset once bolt 129 is returned to the locked (down) position.

Flipping a lever, swiping a card in a slot, inserting a key in a keyway or pushing pushbuttons . . . can all provide the mechanical energy 103 to run generator 101, whose output provides the electrical energy for decision making apparatus 109 and switch 111, which can suitably be a transistor, e.g., a P-channel MOSFET transistor. Keys, cards, pushbutton sequence, fingerprint readers or retina scanners, etc., can also all present, in one form or another, data 133 to decision making apparatus 109. Decision making apparatus 109 evaluates data 133 to arrive at a lock-unlock decision. If the decision is to unlock, decision making apparatus 109 turns on P-MOSFET switch 111 via line 117, resulting in the flowing of electrical current 107 into ohmic electromechanical transducer 105, causing it to heat up. In this case the ohmic electromechanical transducer can, for example, be a piece of SMA wire. The electrical current 107 is electrically and mechanically connected to the ratchet 119, which is grounded via the ground connection shown in FIG. 3A.

Figure 3B:
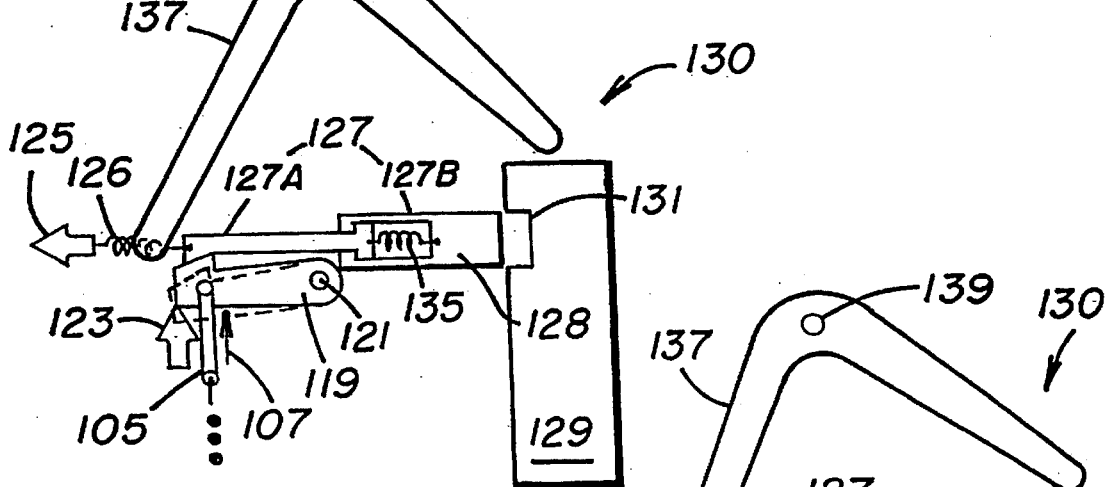

Referring to FIG. 3B, as SMA wire 105 assumes its austenitic state it contracts, and, with its lower end fixed in place, pulls ratchet 119 counterclockwise (shown in dotted line) thereby releasing mechanical gate 127, which, under spring force 125, moves to the left, thereby freeing end 128 of dovetailing bolt 129. The electronics of the system can be designed to cut off current 107 shortly after the release of mechanical gate 127 and SMA wire 105 then returns to the limp, martensitic state.

The operator can then manually lift bolt 129 to unlock the lockset 130.

Figure 3C:
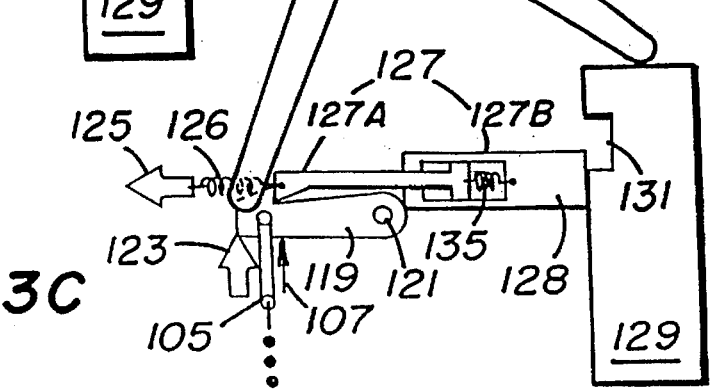

Referring to FIG. 3C, as bolt 129 is lifted, its top pushes against the right end 138 of L-shaped cam 137 and forces it to rotate in the counterclockwise direction. The left end 140 of L-shaped cam 137 soon comes into contact with the left end 142 of inner mechanical gate 127A and starts to push inner mechanical gate 127A to the right. At this point, slot 131 in bolt 129 has already been moved out of alignment with the right end 128 of outer mechanical gate 127B. Further pushing against the left end 142 of inner mechanical gate 127A by the left end 140 of rotating L-shaped cam 137 can only result in telescoping the inner mechanical gate 127A into outer mechanical gate 127B, compressing compression spring 135 in the process. Since the electronics of the system has by now cut off electrical current 107, SMA wire 105 is limp and rachet 119 is pushed all the time by the spring force indicated at 123 against the bottom of inner mechanical gate 127A. As soon as the leftmost bottom point of inner mechanical gate 127A clears the hook of rachet 119, rachet 119 snaps upwards and cocks inner mechanical gate 127A. Thereafter, when bolt 129 is returned to its locked (down) position, either manually or by spring force, outer mechanical gate 127B, under the constant pressure of compression spring 135, snaps to the right into slot 131, thereby returning the lockset 130 to the locked condition.

2. Automatic Derailleur Gear For Bicycles

The gear change in a bicycle derailleur gear is basically affected by changing the tension on the cable connecting the gear lever and the gear change mechanism located next to the rear wheel. A detailed description of how the derailleur gear operates can be found on page 727, volume 6 of the "Illustrated Science and Invention Encyclopedia" (published by H. S. Stutman Co., Inc., New York, N.Y. 10016. Previously published in parts in the United Kingdom under the title, "How It Works," which is incorporated herein by reference).

Figure 4:
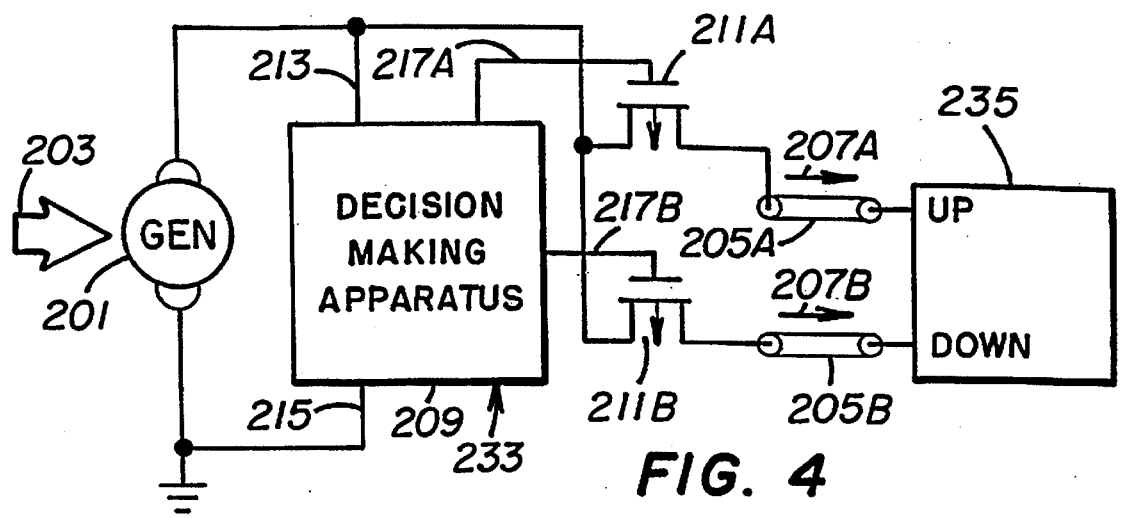
FIG. 4 shows how, with two ohmic electromechanical transducers and the derailleur gear an automatic gear-shifting system for bicycles is implemented.

Referring to FIG. 4, pedaling provides the mechanical energy 203 to run generator 201, which powers decision making apparatus 209. Input data 233 may contain information such as speed, road slope, road conditions, wind resistance, etc., which allow decision making apparatus 209 to decide whether to shift to a higher or lower gear, or stay put. If a decision is made to shift to a higher gear, decision making apparatus 209 turns on switch MOSFET 211A via line 217A so that electric current 207A flows through ohmic electromechanical transducer 205A, which is a segment of SMA wire. SMA wire 205A contracts as the martensitic to austenitic transition occurs and increases the tension in said cable within gear change mechanism 235, causing it to shift to a higher gear. If a decision is reached to shift to a lower gear, decision making apparatus 209 turns on switch MOS- FET 211B via line 217B so that electric current 207B flows through SMA wire 205B, whose contraction causes a decrease in the tension in said cable within gear change mechanism 235, causing it to shift to a lower gear. For cruising, neither of the switches is turned on.

3. Electronic Fishing Reel

The drag of a fishing reel is controlled by the pressure applied to a number of disks or washers whose stationary friction sets the threshold of line tension beyond which slippage among the disks or washers occurs. Such slippage among the disks or washers dissipates mechanical energy derived from the fighting fish, thus tiring the fish. The controlled pressure can be applied via a cable, similar to the arrangement adapted in the bicycle derailleur.

Figure 5:
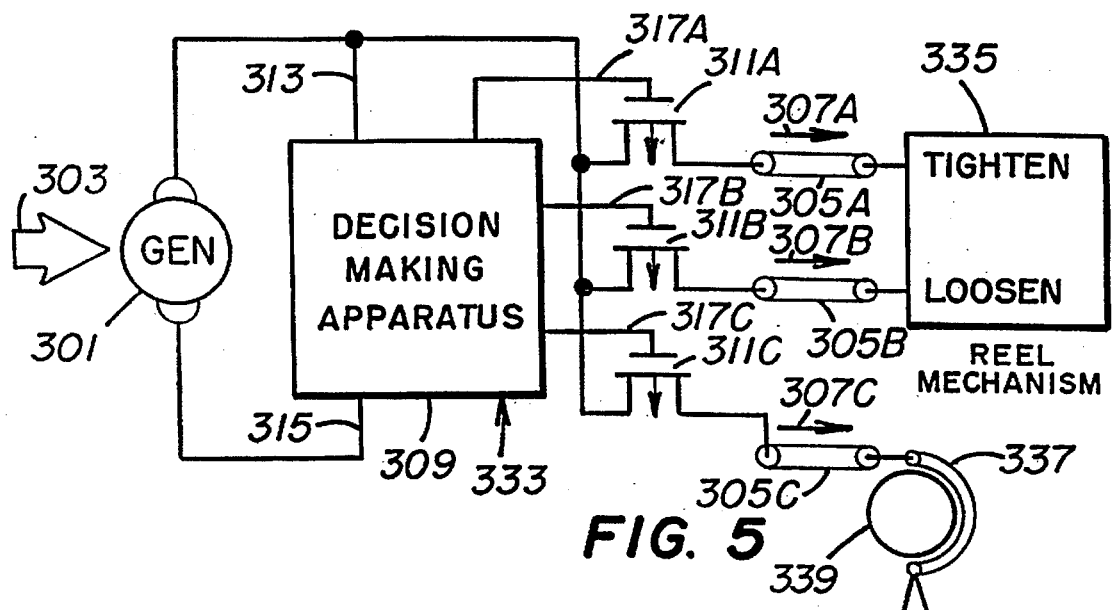
FIG. 5 shows how, with three ohmic electromechanical transducers, drag control and free-spool brake, an electronic fishing reel is implemented.

Referring to FIG. 5, cranking of the reel handle or the spinning of the spool during bait casting can provide the mechanical energy represented by 303 to power generator 301, which powers decision making apparatus 309. Input data 333 may contain information such as outside diameter of the fishing line on the spool, tension on the fishing line, length of fishing line doled out, etc., which allow decision making apparatus 309 to decide whether to tighten or loosen up the drag, or stay put. If a decision is made to tighten up the drag, decision making apparatus 309 turns on switch MOSFET 311A via line 317A so that electric current 307A flows through ohmic electromechanical transducer 305A, which is a segment of SMA wire. SMA wire 305A contracts and activates the reel mechanism 335 to tighten the drag. If a decision is reached to loosen the drag, decision making apparatus 309 turns on switch MOSFET 311B via line 317B so that electric current 307B flows through SMA wire 305B, whose contraction causes reel mechanism 335 to loosen the drag. For unchanged drag level, neither of the switches is turned on.

There are two major types of fishing reels: the spin reel and the conventional reel. The former has a spool axle parallel to the fishing rod, whereas the latter has a spool axle perpendicular to the fishing rod.

Back-lashing in a fishing reel occurs when a spinning spool is not brought to an abrupt stop shortly after the cast bait hits the water. The resulting tangle can take hours to undo.

During bait casting, the spin reel relies on the momentum of the cast bait to continuously strip the fishing line off the stationary spool, therefore back-lashing is not a problem.

The spool of a conventional reel spins with its own momentum during bait casting. The angler has to 1) slow down the spinning by applying a light pressure on the fishing line around the spool, lest the spinning spool "overruns" the airborne bait, which is ever slowing down due to air friction, and 2) clamp down on the spool and bring it to an abrupt stop the moment the bait hits the water, both in order to prevent inadvertently releasing excess fishing line which can double back onto the still-spinning spool, causing back-lash.

During bait casting, the level of tension on the fishing line is measured and reported as input data 333 to decision making apparatus 309, which periodically turns on switch MOSFET 311C with short electrical pulses via line 317C so that short pulses of electrical current 307C flow through SMA wire 305C. Resulting from the ohmic heating of these electrical current pulses, short and crisp contractions of SMA wire 305C pull brake shoe 337 against brake drum 339 with short and crisp jabs, simulating the light pressure applied to the fishing line on the spool by the angler, except in this case the tension on the fishing line is maintained at a much more precise level because of the precision of the electronics . . . As it hits the water, the cast bait abruptly slows down while the angular momentum keeps the spool spinning, resulting in great reduction in line tension, which is measured and reported as input data 333 to decision making apparatus 309. In an effort to maintain a preset level of fishing line tension, decision making apparatus 309 changes the periodic short electrical pulses on line 317C into a continuous electrical signal, which turns switch MOSFET 311C hard on, and the short electrical current pulses 307C turn into a direct electrical current. The continuous electrical current 307C heats SMA wire 305C and causes it to contract continuously to pull brake shoe 337 continuously against brake drum 339, which is part of the spool, forcing the spool to come to an abrupt stop, thereby avoiding any nasty back-lash of the fishing line.

4. Drug Dispenser

Figure 6:
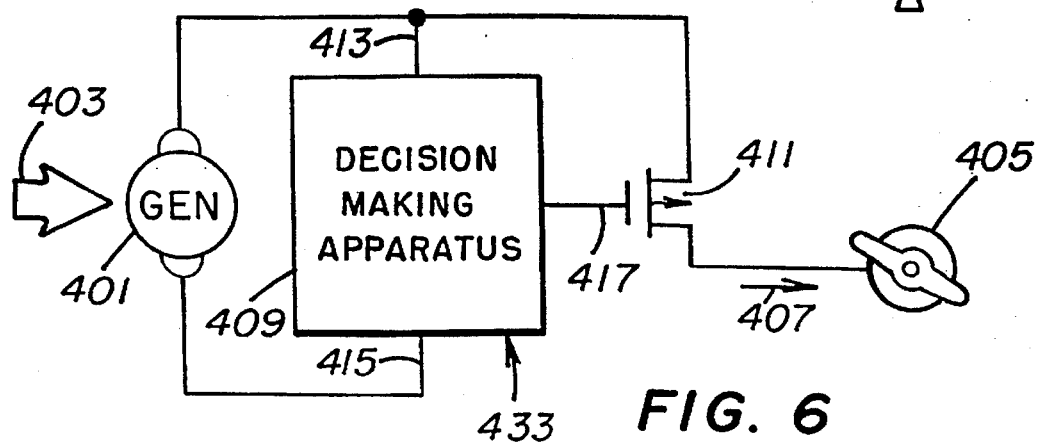
FIG. 6 shows how, with a valve made of ohmic electromechanical material, a drug dispensing system is implemented.

Referring to FIG. 6, generator 401 is powered by the mechanical energy represented by 403 extracted from the bodily movements of the patient using the system. Self-winding mechanism for some watches can be readily adapted for such purpose. Generator 401 provides the electrical energy needed by decision making apparatus 409 via lines 413 and 415. Input data 433 presents information such as body temperature, pulse rate, level of specific drugs, hormones, compounds, etc., in the blood stream . . . to decision making apparatus 409, which may contain a time keeping function to help it arrive at decisions. When a decision has been made to dispense the drug, decision making apparatus 409 turns on switch MOSFET 411 via line 417 so that electric current 407 flows through valve 405 which is made of ohmic electromechanical material so that valve 405 opens to allow the drug to be dispensed.

Such a system can either be worn on the body at locations such as the wrist, or can be subcutaneously implanted. Drug dispensing can also take on one of many forms, such as on the skin or intravenously.

Industrial Applicability

The invention is useful in many ways, including in locksets, fishing reels and derailleur gears as well as with other apparatus. Sufficient movement is provided for the gating function so that unusually close tolerance need not be required in construction.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A pseudo-mechanical system comprising:
   an electrical generator adapted to convert mechanical energy into electrical energy;
   means for delivering mechanical energy to the electrical generator;
   an ohmic electromechanical component which assumes a first form when above a selected temperature and a second form when below the selected temperature;
   circuit means for passing electrical energy from the electrical generator through the ohmic electromechanical component, the electrical energy being sufficient to raise the temperature of the ohmic electromechanical component from below the selected temperature to above the selected temperature;

a decision making apparatus for selectively controlling the circuit means to pass electrical energy from the electrical generator through the ohmic electromechanical component only when one or more status conditions meet a selected criterion;

sensor means for determining the status conditions and for transmitting a signal to the decision making apparatus identifying the status conditions;

a structure connected to have a force applied to it by the ohmic electromechanical component in response to the electromechanical component shifting from its second form to its first form, the structure being adapted to move in response to application of the force; and means for performing additional mechanical work, which is separate and distinct from the work performed by the force applied by the ohmic electromechanical component, in response to movement of the structure as the electromechanical component shifts from its second form to its first form.

2. A pseudo-mechanical system as set forth in claim 1, wherein the ohmic electromechanical component comprises a shape memory alloy.

* * * * *